United States Patent [19]

Yamaguchi et al.

[11] Patent Number: 4,721,179
[45] Date of Patent: Jan. 26, 1988

[54] DOUBLE SWING-ARM MOTORCYCLE FRAME

[75] Inventors: Ken Yamaguchi; Akio Kawano; Keiji Ono, all of Saitama, Japan

[73] Assignee: Honda Giken Kogyo Kabushiki Kaisha, Tokyo, Japan

[21] Appl. No.: 919,160

[22] Filed: Oct. 15, 1986

[30] Foreign Application Priority Data

Oct. 15, 1985 [JP] Japan ................. 60-229579
Oct. 15, 1985 [JP] Japan ................. 60-229580

[51] Int. Cl.$^4$ ............................................. B62K 25/26
[52] U.S. Cl. .................... 180/219; 280/275; 280/284; 280/281 R
[58] Field of Search .............. 280/281 R, 275, 277, 280/283, 284; 180/219

[56] References Cited

U.S. PATENT DOCUMENTS

| 4,082,307 | 4/1978 | Tait ..................... 280/277 |
| 4,189,168 | 2/1980 | Courtney ................ 280/284 |
| 4,280,582 | 7/1981 | Kouyama et al. ......... 180/219 |
| 4,526,249 | 7/1985 | Parker .................. 180/219 |

Primary Examiner—John J. Love
Assistant Examiner—Donn McGiehan
Attorney, Agent, or Firm—Sughrue, Mion, Zinn, Macpeak & Seas

[57] ABSTRACT

A motorcycle frame in which both the front and rear wheels are supported by respective pairs of swing arms pivotally supported by two side frames. Each side frame has a front and a rear bracket and a connecting structure extending upwardly and longitudinally over the engine. The connecting structure may be integral with both of the brackets or may be a pipe frame bolted to the brackets.

9 Claims, 7 Drawing Figures

DOUBLE SWING-ARM MOTORCYCLE FRAME

BACKGROUND OF THE INVENTION

1. Field of the Invention

This invention relates to a two-wheeled motorcycle equipped with brackets installed both in front and in rear of both sides of its engine and made to support swing arms for bearing front and rear wheels of the motorcycle.

2. Background of the Invention

Japanese Pat. No. 49435/83 discloses a motorcycle of the sort described above. That motorcycle has brackets fixedly installed in front and in rear of both sides of an engine unit incorporating an engine, a gear case and the like. Swing arms which are supported by the front brackets are used to suspend a front wheel. Swing arms which are supported by the rear brackets are used to suspend a rear wheel. A steering rod coupled to a handle bar supported by a tripod is installed on the engine unit through a universal joint. In comparison with a conventional motor bicycle employing a body frame having a head pipe, the above described structure is far lighter because the body frame has been simplified.

In the case of the above-described motorcycle, however, the components such as a fuel tank and a seat which form part of the motorcycle and need to be mounted on the engine are separately supported by the brackets fixed to the engine. In consequence, this structure requires a lot of labor to assemble the parts and the additional parts complicate manipulation and control of the parts.

SUMMARY OF THE INVENTION

An object of the present invention is to facilitate the procedure of assembling component parts constituting a motorcycle.

In order to accomplish the above object, the motorcycle according to the present invention has brackets in front and in rear of both sides of its engine and has swing arms respectively rotatably supported by front and rear brackets to bear front and rear wheels. The motorcycle of the invention is characterized in that the front and rear brackets are extended up the cycle body and the upper portions of the brackets are coupled to coupling members installed astride the engine. The coupling members are supported by the engine while supporting a fuel tank, a seat and other components forming part of the vehicle.

With the above arrangement, the fuel tank the seat, etc., forming part of the vehicle can readily be secured to the vehicle.

BRIEF DESCRIPTION OF THE DRAWINGS

FIG. 1 is a side view of a motorcycle.

FIG. 2 is a sectional view taken on line II—II of FIG. 1.

FIG. 3 is a sectional view taken on line III—III of FIG. 1.

FIG. 4 is a sectional view taken on live V—V.

FIG. 5 is a side of a motorcycle.

FIG. 6 is a sectional view taken on line VI—VI of FIG. 5.

FIG. 7 is a sectional view taken on line VII—VII of FIG. 5

DETAILED DESCRIPTION OF THE PREFERRED EMBODIMENTS

Referring now to the accompanying drawings, two embodiments of the present invention will be described. FIGS. 1 through 4 show a first embodiment of the present invention. Since the following component parts, in combination, are installed on both sides of a vehicle body, reference will be made to those on one side only.

A motorcycle 1 is fitted with side frames 2, roughly in an inverted U-shape, on both sides of an engine unit 3 incorporating an engine and a gear case.

Figure 1:
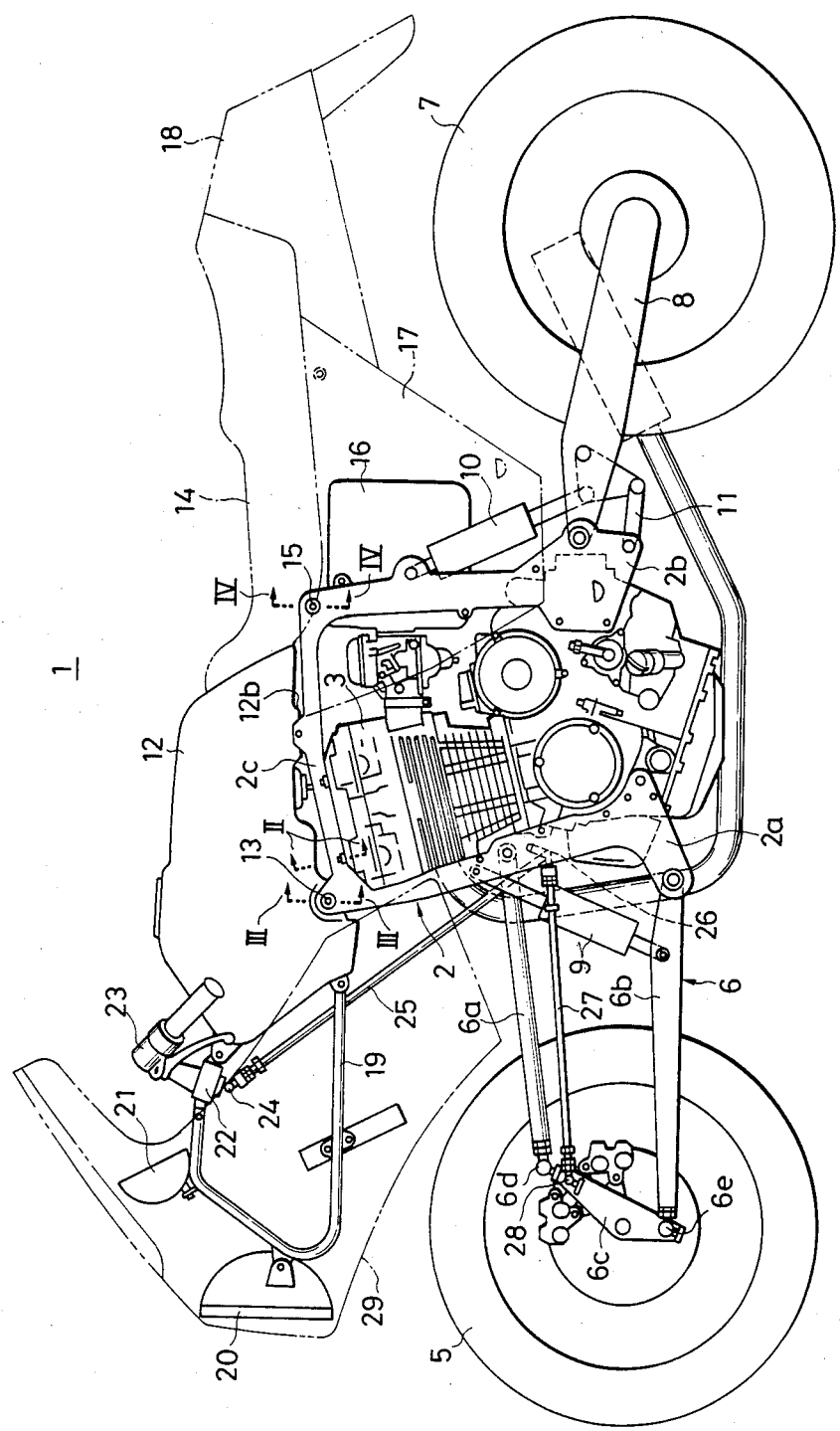
FIGS. 1 through 4 show an embodiment of the present invention.
Figure 2:
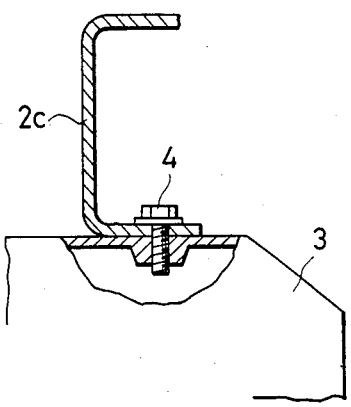
Figure 3:
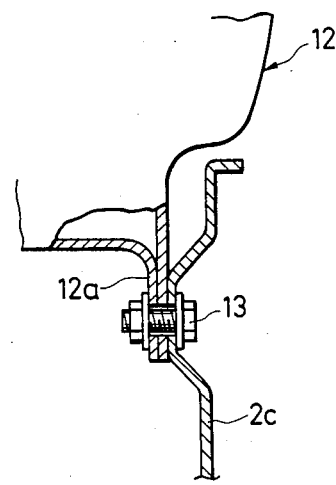

A front bracket 2a of the side frame 2 is fixed to the front lower side of the engine unit 3 and extends up the side of the vehicle. A rear bracket 2b of the side frame 2 is fixed to the rear side of the engine unit 3 and also extends up the side of the vehicle. A coupling member 2c of the side frame 2 couples the upper portions of the brackets 2a and 2b. The front and rear brackets 2a and 2b and the coupling member 2c are formed in one body. The coupling member 2c is fixed to the upper side of the engine unit 3 with bolts 4 (FIG. 2). A front swing arm 6 for bearing a front wheel 5 is rotatably supported by the front bracket 2a, whereas a swing arm 8 for bearing a rear wheel 7 is rotatably supported by the rear bracket 2b.

The front swing arm 6 has one set of ends of its upper and lower arms 6a and 6b each rotatably pivotally fitted to the front-bracket 2a. The front end of the upper arm 6a is coupled with a ball joint 6d to the upper portion of a front wheel support member 6c for bearing a front wheel 5, whereas the front end of the lower arm 6b is coupled with another ball joint 6e to the lower portion of the front wheel support membr 6c. A suspension 9 is arranged and supported between the lower arm 6b and the front bracket 2a. The rear swing are 8 is supported in such a manner that a suspension 10 is arranged between a link mechanism 11 connected to the rear swing arm 8 and the rear bracket 2b.

A fuel tank 12 forming part of the vehicle is mounted on the front surface of the coupling member 2c of the side-frame 2. As shown in detail in FIG. 3, a flange 12a on the front underside of the fuel tank 12 is fixed to the coupling member 2c with a bolt 13, whereas another flange 12b on the rear underside of the fuel tank 12 is fixed to the coupling member 2c to support the fuel tank 12. As shown in detail in FIG. 4, a seat 14 forming part of the vehicle is fixed to the coupling member 2c with a bolt 15 to the rear of the fuel tank 12. An air cleaner 16 is arranged under the seat 14.

Figure 4:
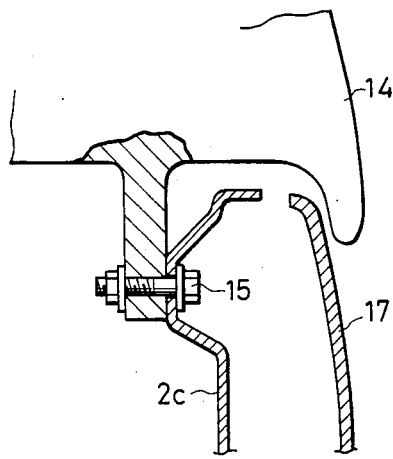

A side cover 17, shown in FIG. 4, is installed from the lower rear side of the fuel tank 12 to the lower portion of the seat 14 and a rear-cover 18 (FIG. 1) is stretched between the rear side of the side cover 17 and the rear-side of the seat 14.

A stay 19 in the form of a bent pipe is installed in front of the fuel tank 12. A headlight 20 and a meter 21 are supported by the stay 19. A handle support 22 is installed between where the stay 19 and the fuel tank 12 are coupled and a handle bar 23 is connected to a coupling rod 25 through a universal joint 24. The coupling rod 25 is coupled to a steering arm 27 through a link mechanism 26 supported by the front bracket 2a. The front end of the steering arm 27 is connected to the front wheel support member 6c through a universal joint 28.

Thereby, the front wheel 5 is steered by the operation of the handle bar 23.

A front cover 29 for covering the headlight 20 and the meter 21 is arranged at the front end of the vehicle.

Since the vehicle is thus constructed, the fuel tank 12, the seat 14, etc. forming part of the vehicle are readily secured to the coupling member 2c of the side frame 2 and therefore assembly is facilitated.

The motorcycle according to the present invention has brackets in front and in rear of both sides of its engine and swing arms respectively rotatably supported by front and rear brackets to bear the front and rear wheels. The front and rear side brackets are extended up the vehicle body and the upper portions thereof are coupled to the coupling member installed astride the engine. Further, the coupling member is supported by the engine while supporting the fuel tank, the seat and other components forming part of the vehicle, so that the assembly workability is improved as the component parts are readily secured to the vehicle.

Figure 5:
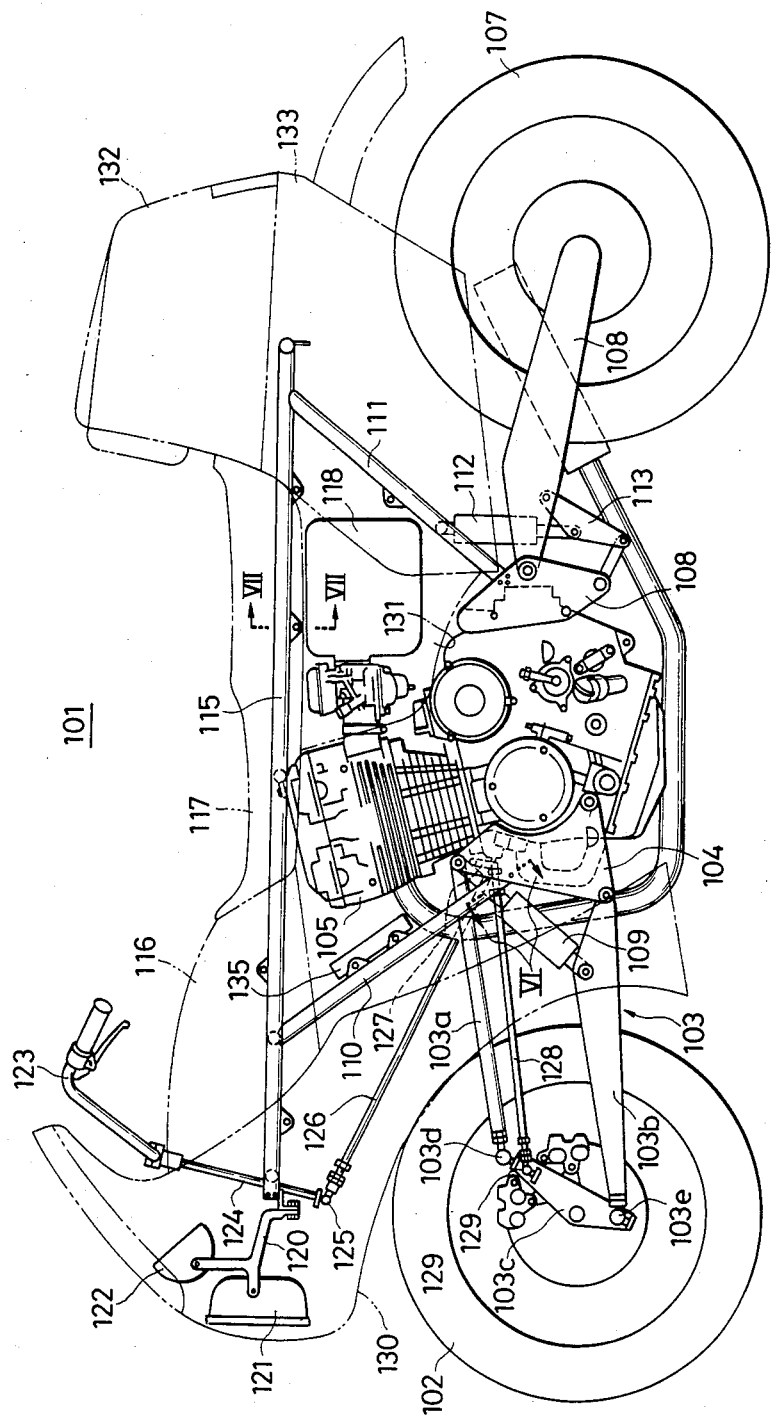
FIGS. 5 through 7 show another embodiment of the present invention.
Figure 6:
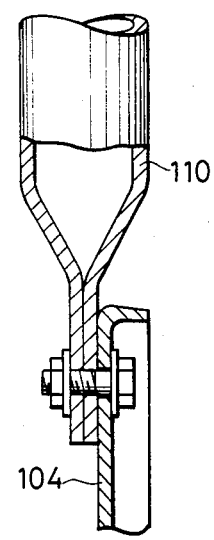
Figure 7:
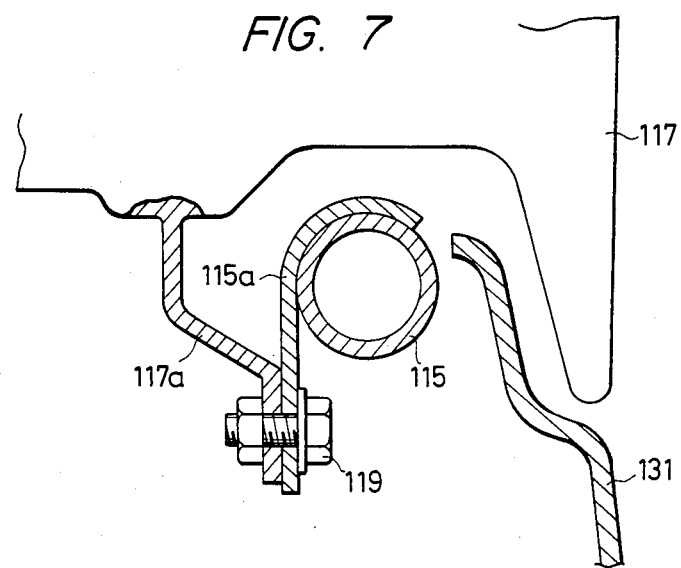

Referring to FIGS. 5 through 7, another embodiment of the present invention will now be described.

A motorcycle 101 has a plate-like front bracket 104 for rotatably supporting a front swing arm 103 for bearing a front wheel 102. The front bracket 104 is installed in front of the side of an engine unit 105 incorporating an engine and a gear case. A plate-like rear bracket 108 rotatably supports a rear swing arm 107 for bearing a rear wheel 106. The rear bracket 108 is also installed in rear of the side of the engine unit 105. The front and rear brackets 104 and 108 are bolted to the engine unit 105.

The front swing arm 103 has one set of ends of its upper and lower arms 103a and 103b each being rotatably and pivotally coupled to the front bracket 104. The front end of the upper arm 103 is coupled to the upper portion of a front wheel support member 103c for bearing the front wheel 102 through a ball joint 103d, whereas the front end of the lower arm 103b is coupled to the lower portion of the front wheel support member 103c through a ball joint 103e. A suspension 109 is arranged between the lower arm 103 and the front side-bracket 104.

The front bracket 104 is fitted with a vertical pipe frame 110 extending to the front upper side of the engine unit 105, and the rear-bracket 108 is fitted with a vertical pipe frame 111 extending to the rear upper side of the engine unit 105. A suspension 112 is arranged between the rear pipe frame 111 and a link mechanism 113 is pivotally fixed between the rear swing arm 107 and the rear bracket 108 so as to support the rear swing arm 107. As shown in FIG. 6, the vertical pipe frames 110 and 111 are bolted to the side brackets 104 and 108.

A horizontal pipe frame 115 couples the upper portions of the vertical pipe frame 110 and 111 in the longitudinal direction of the vehicle above the engine unit 105. The two horizontal pipe frames 115 on the two dies are joined by transverse pipes as indicated by dotted circles. Also, a radiator 135 links the two vertical pipe frames 110. The pipe frames 110, 111 and 115 may be welded together. The horizontal pipe frame 115 is fitted with component parts such as a fuel tank 116 and a seat 117 forming part of the vehicle. An air cleaner 118 is arranged under the seat 117.

As shown in FIG. 7, the seat 117 is installed by fixing a bracket 117a in the lower portion of the seat 117 to a bracket 115a of the horizontal pipe frame 115 with a bolt 119.

Moreover, a support arm 120 is installed at the front end of the horizontal pipe frame 115, and a headlight 121 and a meter 122 are supported by the support arm 120. A handle bar 123 arranged in front of the upper portion of the fuel tank 116 has a steering shaft 124 supported by the front portions of the two horizontal pipe frames 115 and a coupling rod 126 is connected to the lower end of the steering shaft 124 through a universal joint 125. The coupling rod 126 is coupled to a steering are 128 through a link mechanism 127 supported by the front bracket 104. The front end of the steering arm 128 is connected to the front wheel support member 103c through a universal joint 129, whereby the front wheel is steered by the operation of the handle bar 123.

A front cover 130 for covering the sides of the vehicle from the front side of the headlight 121 is arranged in the front portion of the vehicle and a side cover 131 (FIG. 7) is arranged on the lower side of the seat 117. As shown in FIG. 5, a center box 132 and a side-box 133 under the center box 132 are arranged at the rear of the seat 117.

Since the motorcycle is thus constructed, the headlight 121, the meter 122, the fuel tank 116, the seat 117 and other components forming part of the vehicle are readily secured to the horizontal pipe frame 115 and assembly is thus facilitated.

As set forth above, the motorcycle according to the present invention has brackets in front and in rear of both sides of its engine and swing arms are respectively rotatably supported by the front and rear brackets to bear the front and rear wheels. Vertical pipe frames respectively extend from the front and rear side upward in front and in rear of the engine and the horizontal pipe frames respectively connect the upper portions of the vertical pipe frames in the logitudinal direction of the vehicle. Thereby workability is improved since the headlight, the meter, the fuel tank, the seat and other components forming part of the vehicle are readily secured to the horizontal pipe frames.

We claim:

1. A motorcycle, comprising:
   an engine unit having a front portion and a rear portion and including an engine and a gearcase;
   a front wheel;
   a rear wheel;
   a front swing arm (6) bearing said front wheel;
   a rear swing arm (8) bearing said rear wheel;
   a left and right side frame, each comprising;
   a front bracket (2a) pivotally supporting a rear end of said front swing arm, said front bracket being fixed to said front portion of said engine unit,
   a rear bracket (2b) pivotally supporting a front end of said rear swing arm, said rear bracket being fixed to said rear portion of said engine unit, and
   connecting means connecting said front and rear brackets and including a first vertical piece extending upwardly from said front bracket in front of said engine, a second vertical piece extending upwardly from said rear bracket to the rear of said engine, and a horizontal piece 2c extending longitudinally between respective upper portions of said two vertical pieces;
   said motorcycle further comprising:
   a handle bar supported by said horizontal piece;
   a fuel tank supported by said horizontal piece; and
   a seat supported by said horizontal piece.

2. A motorcycle as recited in claim 1, wherein each of said left and right side frames comprises an integral structure of said front and rear brackets, said first and second vertical pieces and said horizontal piece.

3. A motorcycle as recited in claim 2, wherein said engine unit is fixed to each of said horizontal pieces.

4. A motorcycle as recited in claim 1, wherein said first and second vertical pieces and said horizontal pieces are pipes.

5. A motorcycle as recited in claim 4, wherein said first and second vertical pieces and said horizontal pieces in each of said side frames are a respective integral pipe frame.

6. A motorcycle as recited in claim 5, further comprising integral transverse pipes coupling said two horizontal pieces.

7. A motorcycle as recited in claim 6, wherein said integral pipe frames are bolted to a respective one of said front and rear brackets and said front and rear brackets are bolted to said engine unit.

8. A motorcycle, comprising:
an engine unit including an engine and a gearcase;
a front wheel;
a rear wheel;
a left and a right front swing arm bearing said front wheel;
a left and a right rear swing arm bearing said rear wheel;
a left and right side frame, each comprising;
a front bracket pivotally supporting a respective one of said front swing arms,
a rear bracket pivotally supporting a respective one of said rear swing arms, and
connecting means connecting said front and rear brackets and including a first vertical piece extending upwardly from said front bracket in front of said engine, a second vertical piece extending upwardly from said rear bracket to the rear of said engine, and a horizontal piece extending longitudinally between upper portions of said two vertical pieces;
said motorcycle further comprising:
a headlight supported by said horizontal piece;
a meter supported by said horizontal piece;
a fuel tank supported by said horizontal piece; and
a seat supported by said horizontal piece,
wherein each of said left and right said frames comprises an integral structure with said front and rear brackets, said first and second vertical pieces and said horizontal piece, said engine unit being fixed to each of said horizontal pieces, and an arm, mounted on said fuel tank, for mounting said headlight and said meter, said fuel tank and said seat being bolted to said horizontal pieces.

9. A motorcycle as recited in claim 1, wherein said engine unit has a top portion and a bottom portion, and said first and second vertical pieces extend upwardly to at least the level of said top portion of said engine unit.

* * * * *